(12) United States Patent
Morales

(10) Patent No.: US 10,832,102 B1
(45) Date of Patent: Nov. 10, 2020

(54) SENSOR-ASSISTED TAB PRINTING

(71) Applicant: KYOCERA Document Solutions, Inc., Osaka (JP)

(72) Inventor: Javier A. Morales, Rochester, NY (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/446,245

(22) Filed: Jun. 19, 2019

(51) Int. Cl.
*G06K 15/02* (2006.01)
*G06F 3/12* (2006.01)

(52) U.S. Cl.
CPC ........... *G06K 15/021* (2013.01); *G06F 3/121* (2013.01); *G06F 3/125* (2013.01); *G06K 15/1822* (2013.01)

(58) Field of Classification Search
None
See application file for complete search history.

(56) References Cited

U.S. PATENT DOCUMENTS

| | | | |
|---|---|---|---|
| 6,549,300 B2 | 4/2003 | Motamed et al. | |
| 2001/0043346 A1* | 11/2001 | Roztocil | G06F 3/1253 358/1.9 |
| 2002/0180822 A1 | 12/2002 | Aritomi | |
| 2004/0179231 A1 | 9/2004 | Savino et al. | |
| 2011/0129239 A1* | 6/2011 | Kubota | G03G 15/2032 399/16 |
| 2011/0205563 A1* | 8/2011 | Stewart | H04N 1/00708 358/1.9 |

* cited by examiner

*Primary Examiner* — Frantz Bataille
(74) *Attorney, Agent, or Firm* — Rowan TELS LLC

(57) ABSTRACT

A method and system for scanning a set of tabs, sensing tab shape information for tab positions in the set of tabs, storing sensed tab shape information, and applying the sensed tab shape information to printing applications. Sensed tab shape information is used to mask areas around tabs during tab printing tasks, allowing full bleed printing at each of the tab positions. Sensed tab shape information is also used to detect and purge unused tabs and automatically format tab printing annotations.

20 Claims, 9 Drawing Sheets

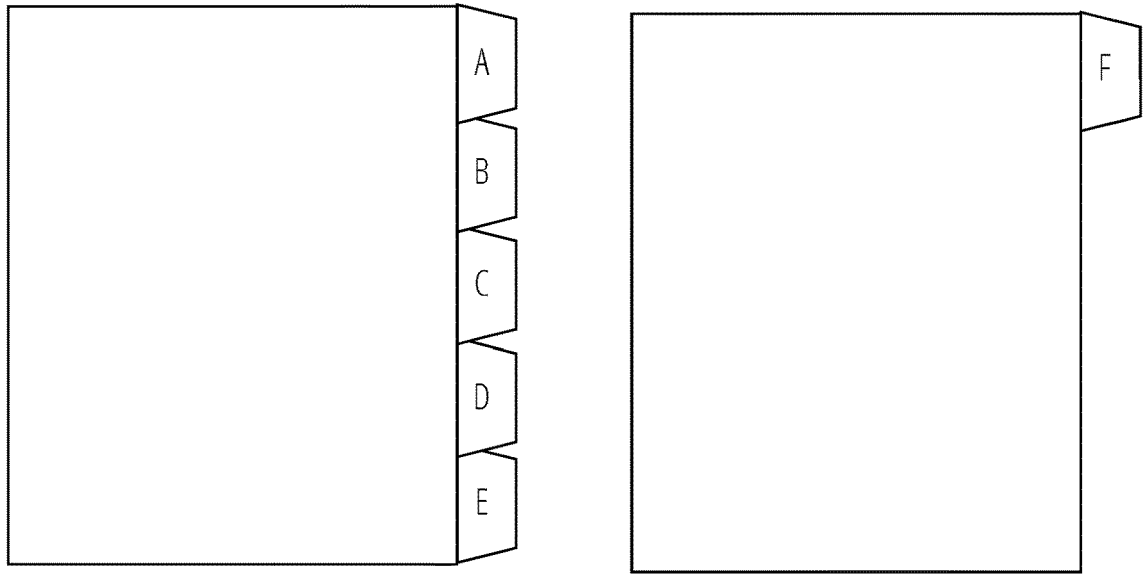
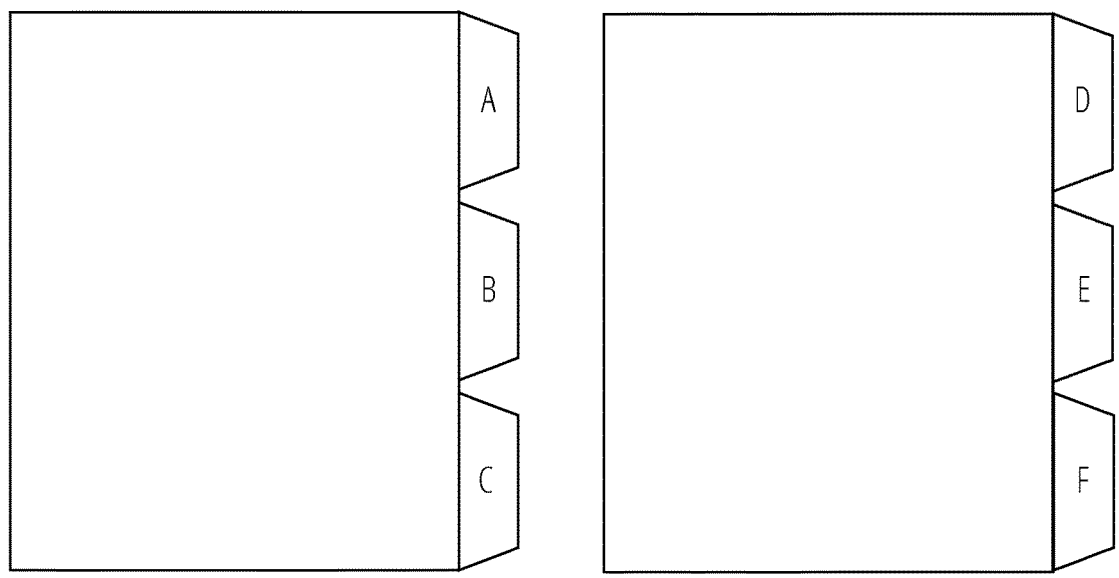
FIG. 6

SENSOR-ASSISTED TAB PRINTING

BACKGROUND

Conventional tab printing methods and systems can be prone to error and require a number of rigidly followed manual steps, both to execute a tab printing task and to recover from a failed tab printing task.

There is a need to develop a simpler, more reliable, and more flexible tab annotation process. There is a need for a more efficient and automated way to complete a tab printing task, and there is a need for a method and system that allow for full bleed tab printing without die cutting, with fewer restrictions on background colors or images that can be printed on tabs. "Bleed" refers to printing that goes beyond the edge of where the sheet will be cut. In other words, the bleed is the area to be trimmed off by the die cutter. The bleed is the part along the edge of a paper product that gives the printer a small amount of space to account for movement of the paper and design inconsistencies. Artwork and background colors often extend into the bleed area. After cutting, the bleed ensures that no unprinted edges occur in the final cut document.

BRIEF SUMMARY

This disclosure relates to a method and system for sensor-assisted tab printing. A tab bank is scanned and tab shape information for tab positions in the scanned tab bank are sensed during the scan. The sensed tab shape information may be stored for future use. The stored tab shape may be provided to printing applications. Printing applications may use the tab shape information while performing tab printing tasks.

A method for sensor-assisted tab printing includes scanning a set of tabs, wherein the set of tabs includes at least one tab sheet, the tab sheet being a sheet of material that may be appropriate for printing on which part of a side extends out from the side as a tab. Tab shape information is sensed for tab positions in the set of tabs. The sensed tab shape information is stored and applied to printing applications to perform at least one of (a) masking areas around tabs during tab printing tasks, wherein masking the areas around tabs allows full bleed printing at each of the tab positions, (b) detecting and purging unused tabs between the tab printing tasks, and (c) automatically formatting tab printing annotations.

A sensor-assisted tab printing system includes a scanning device, a sensor capable of sensing tab shape information, a printing device; and a computing apparatus. The computing apparatus includes a processor and a memory storing instructions that, when executed by the processor, configure the system to scan a set of tabs and sense the tab shape information for tab positions in the set of tabs. The sensed tab shape information is stored and applied to printing applications to perform at least one of (a) mask areas around tabs during tab printing tasks wherein masking the areas around tabs allows full bleed printing at each of the tab positions, (b) detect and purge unused tabs between the tab printing tasks, and (c) automatically format tab printing annotations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 illustrates tab annotation adjustments 600 in accordance with one embodiment.

DETAILED DESCRIPTION

Figure 1:
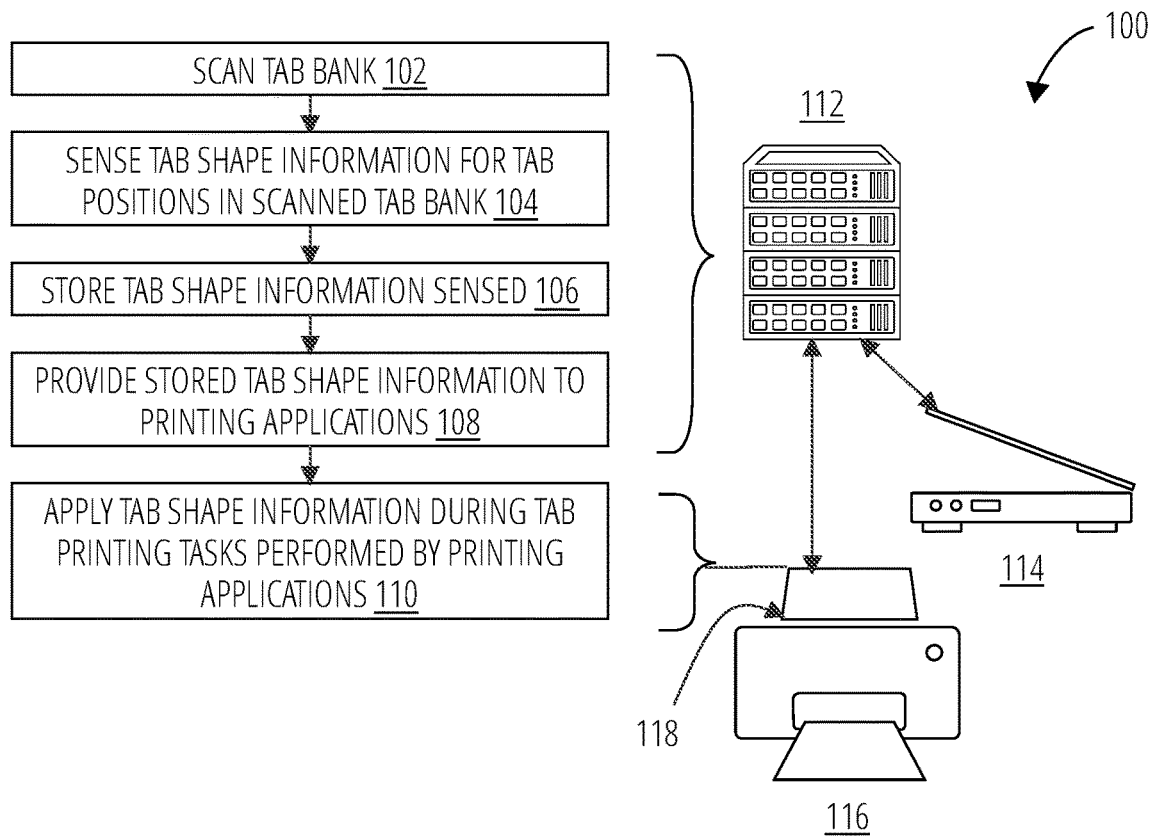
FIG. 1 illustrates a sensor-assisted tab printing method 100 in accordance with one embodiment.

This disclosure relates to a method and system for sensor-assisted tab printing. Tab printing may include printing on tabs and may also include putting together a print job that includes tabs where the tab may or may not be printed on.

In an embodiment, a tab bank for use in a tab printing task is scanned. The tab bank comprises at least one tab sheet, wherein the tab sheet is a sheet of material appropriate for printing in which a portion of one side extends beyond the rest of that side as a tab. See FIG. 2 for an illustration of a tab bank.

Scanning the tab bank may be accomplished by feeding it into a scanning device. An embodiment of the scanning device may capture scanned information by means of a contact image sensor or some other image detecting sensor. "Contact image sensor" refers to an optical sensor that contacts or is in close proximity with the object to be scanned. A contact image sensor may comprise a linear array of detectors, covered by focusing lenses and flanked by light emitting diodes for illumination.

The scanning device may be part of a multifunctional peripheral that also incorporates a printing device. A multifunctional peripheral refers to a device that performs a variety of functions that would otherwise be carried out by separate peripheral devices. A multifunctional peripheral typically includes at least two of the following: a printer, a scanner, and a copier.

The contact image sensor may detect tab shape information for the scanned tab bank. In some embodiments, a sensor-assisted tab printing system may be configured to detect if any tab positions are missing from the tab bank and to generate approximate tab shape information for missing tab positions. "Tab position" refers to a point in the intended order of a tab bank. For example, if a tab bank comprises three tabs with the tab on the first tab sheet being proximal to the top edge of the sheet, the tab on the next tab sheet being vertically centered between the top and bottom edges, and the tab on the last tab sheet being proximal to the bottom edge of the tab sheet, the tab bank may be said to have three tab positions. The top most tab position may be referred to as the first tab position or "position 1."

The tab shape information sensed during the scan may be stored in a paper catalog, for example in the paper catalog maintained by a printer or device that controls a printer, for future use. The stored tab shape information may be provided to printing applications such as a digital front end application and upstream MakeReady applications. "Digital front end (DFE) application" refers to a digital mechanism that accepts a print file (for example a PDF or PostScript file) and transforms that file into a format that the print engine (e.g., toner or inkjet) operates to form printing on the substrate or a multi-purposed file for use on the Internet or for CD-ROMs. Digital front end applications are capable of handling multiple functions and workflows at once. A DFE may provide network services, print spooling, Open Process Interface technology, color management processing, Raster Image Processor functionality, trapping and screening, as well as direct imaging to digital proofers, imagesetters, platesetters and wide-format color printers. "MakeReady application" refers to a computer application used to configure a printing device for printing a job including adjustments to color, brightness, media type, and media size. "print job data" includes all of the information necessary for printing items such as documents, books, posters, pamphlets, but is not limited thereto. Print job data may be supplied to printing application as a print file, and may include information related to content such as text and figures, media type and size, colors, fonts, tabs, covers, etc.

Figure 3:
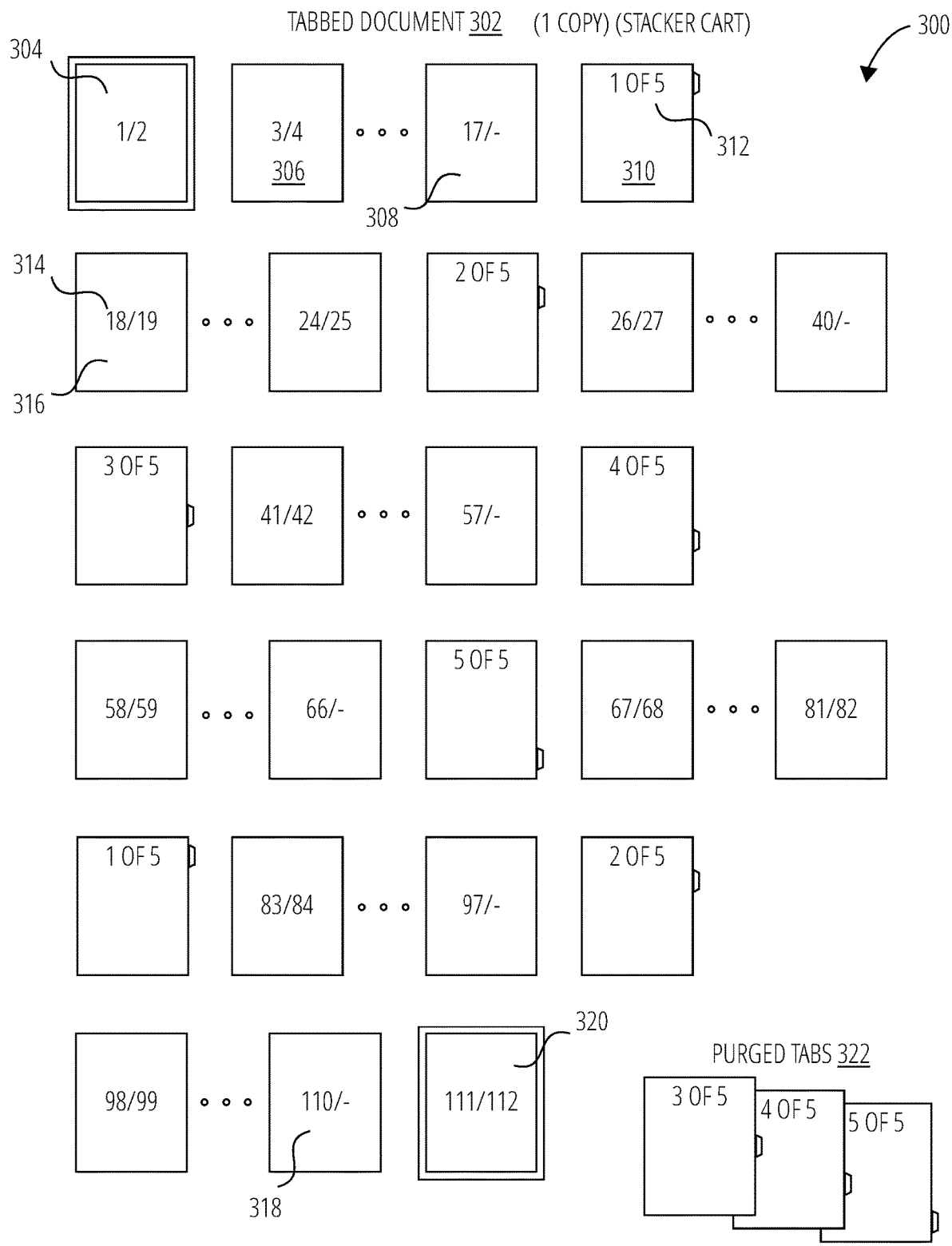
FIG. 3 illustrates tab printing task elements 300 in accordance with one embodiment.

Printing applications may use the tab shape information while performing tab printing tasks. FIG. 3 illustrates the tab printing task elements 300 associated with printing a complete tabbed document. The method disclosed herein is illustrated and described in more detail in FIG. 1 below.

In an embodiment, the sensor-assisted tab printing system may read content intended for printing and determine if a tab is needed. If a tab is needed, the system uses sensed tab shape information to determine a type of tab stock needed to print the content intended for printing, and automatically feeds the type of tab stock needed to a printing device based on the sensed tab shape information, wherein the printing device includes a plurality of paper feed elements. If a tab is not needed, then the system prints the content without the tab. The system is able to provide print jobs, with one or more tab stocks, without requiring print instructions with the job.

Figure 9:
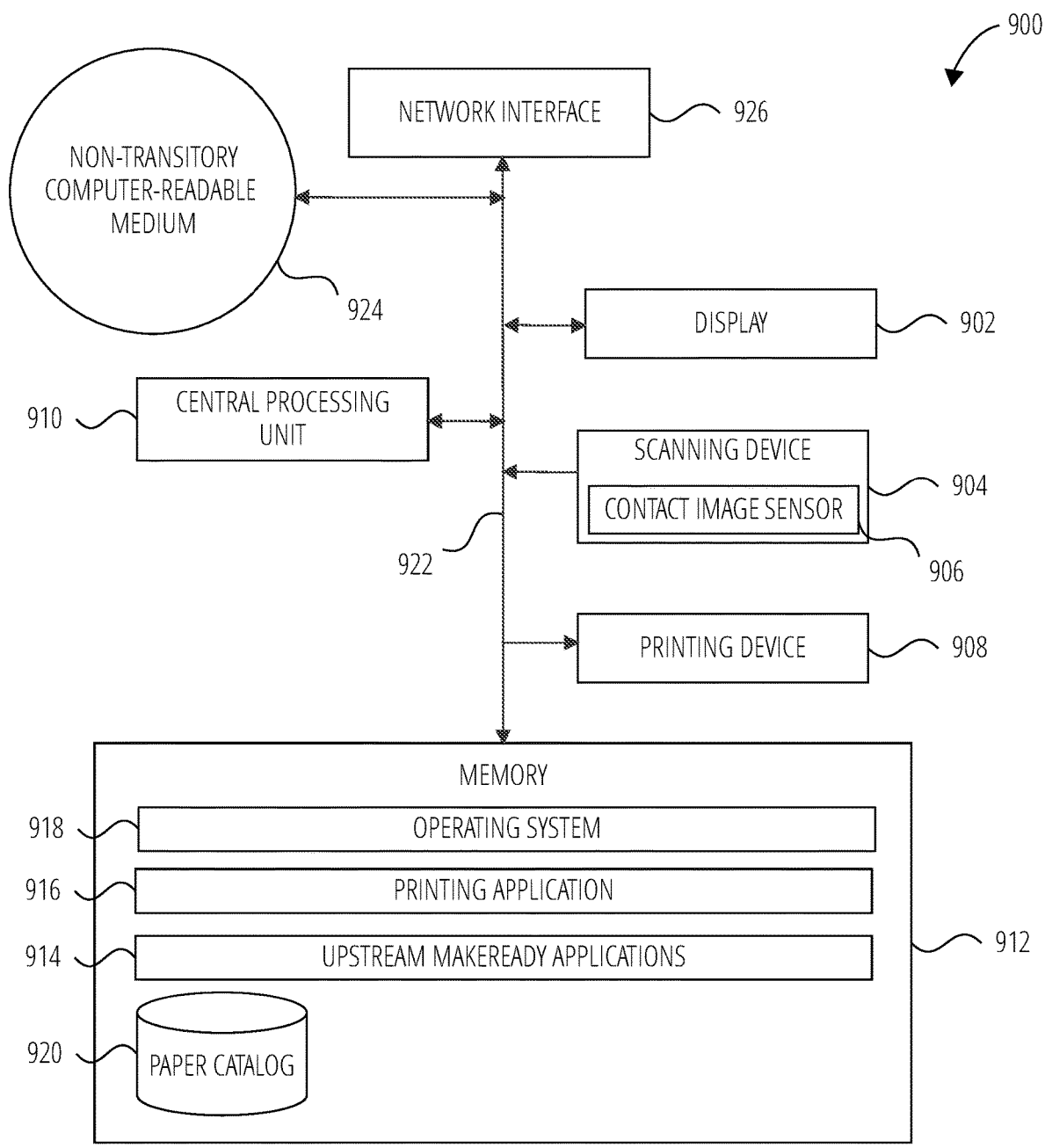
FIG. 9 illustrates a sensor-assisted tab printing system 900 in accordance with one embodiment.

A sensor-assisted tab printing system disclosed herein comprises a scanning device, a sensor capable of sensing tab shape information, a printing device, and a computing apparatus. The computing apparatus includes a processor and a memory. The memory stores instructions that, when executed by the processor, configure the system to implement the method disclosed herein. An embodiment of a sensor-assisted tab printing system is illustrated in FIG. 9.

Referring to FIG. 1, in block 102, sensor-assisted tab printing method 100 scans a tab bank. In block 104, sensor-assisted tab printing method 100 senses tab shape information for tab positions in the scanned tab bank. In block 106, sensor-assisted tab printing method 100 stores the sensed tab shape information. In one embodiment, the tab bank may be fed through a paper path of a multifunctional peripheral. The paper path may include a scanning device with a contact image sensor. The contact image sensor may capture the shape of all the tabs in a specific tab stock, as represented by the tab bank.

The tab shape information captured by the contact image sensor may be stored in the paper catalog. In this manner, the paper catalog definitions may be enhanced over numerous printings to include tab shape information for many tab stocks. In some embodiments, the multifunctional peripheral may be configured with logic that enables it to generate approximate tab shape information in cases where the tab bank scanned is missing one or more tab positions. These actions may in some embodiments be carried out by a computer system 112 coupled to a scanner 114. In other embodiments a multifunctional peripheral may include the functionality of the computer system 112 and scanner 114 and also possibly a printer 116. For example, scanning may be carried out using the paper path and paper feed elements 118 of the printer 116 in some embodiments.

In block 108, sensor-assisted tab printing method 100 provides tab shape information to printing applications that control the printer 116. In some embodiments the printer 116 may be a multifunctional peripheral that includes the functions of the scanner 114. In block 110, sensor-assisted tab printing method 100 uses the tab shape information during tab printing tasks performed by the printing applications. Printing applications may include a digital front end application and upstream MakeReady applications. The printing applications may use the tab shape information in a number of ways to improve printing reliability and performance. A number of these improvements are discussed below. This disclosure is not intended to list such improvements comprehensively; rather, key improvements are given, though many others may be evident to one skilled in the art.

Tab shape information in the paper catalog may be made available to the digital front end application of the multifunctional peripheral as well as upstream MakeReady applications implemented on computing systems operative with the multifunctional peripheral, e.g., connected to the multifunctional peripheral over a wired or wireless connections, or over the Internet. Tab shape information may be used by these applications to simplify production and to improve print system reliability.

Tab shape information may be used to streamline tab purging in cases where a complete or partial print job is executed and part of a tab bank remains unused. Because all positions of the stock may be scanned by the sensor, there may be no need to define a set count for the paper. Instead, the digital front end application may use the tab shape information to automatically determine the number of tabs that may need to be purged between tab banks. Tabs may need to be purged when printing may need to restart at a new bank. For example, if a tab bank contains five tabs, and a particular tab printing task uses four tab sheets in the printing of a product, the last tab sheet may need to be purged before the next tab printing task is initiated. Partial tab banks may need to be purged in response to the tab position being reset between chapters or sections. "Section" refers to any subpart of a document that may be intended to be separated from adjacent pages by a tab sheet, either before it, after it, or both. The ability to accomplish this automatically using the tab shape information may simplify job ticketing and use of tab stocks.

Similarly, when a paper jam condition occurs, tab shape information may allow the printer to keep track of the tab position for all sheets in the print job. After the paper jam is cleared, the system may use the real-time tab shape information from the contact image sensor to determine whether the next sheet in the paper tray has a tab in the correct tab position for continued printing. If not, the system may purge the sheet and additional ones until the required tab position is reached. The system may then continue printing the job. This may eliminate the need for an operator to manually clear sheets from the feeder in order to recover from jams involving tab stocks.

In an embodiment, a sensor-assisted tab printing system is dynamically looking for the first position of the tab so that the print instructions do not need to involve tab details. The instructions may simply demarcate a reset and the system purges unused tabs as needed. Additionally, the system may analyze print job data and determine that purging unused tabs is needed when the next tab position does not match the position in the print job data itself. In this scenario, no print instructions are needed.

A sensor-assisted tab printing system may also use tab shape information to determine if the page description language content matches the tab location. "Page description language" refers to a computer language that specifies the arrangement of a printed page through commands from a computer that the printer carries out. Hewlett Packard's Printer Control Language (PCL) and Adobe's PostScript are the two most commonly used page description languages. If the page description language does not match the tab position, then the system may perform a number of useful functions. The system may ascertain the length of the tab content and position of tab content on a given page to automatically select the correct tab stock, eliminating the need for a user to manually select a specific tab stock. The system may also automatically purge tabs for multi-section books that reset tab position between chapters or sections.

Tab shape information may also be used to facilitate smarter printing. Tab masking may be accomplished using tab shape information, similar to how the contact image sensor may be used to mark holes in drilled paper. The tab shape may be used to mask content that would otherwise print outside of the tab. This may prevent ink spillage on the printer belt and may allow printing of background colors or images on tabs right to the edge of the tab. Current practice only allows background colors or images within a rectangle that does not fully cover the tab background. Refer to the illustration in FIG. 7.

Tab shape information may be used to automate tab annotation formatting. "Tab annotation" refers to textual or graphical content intended to be printed on a tab sheet, whether on the tab itself or elsewhere on the tab sheet. When using data for tab annotations, the system may automatically format the tab text to fit the dimensions of the selected tab stocks (similar to how a text box may be resized in Power-Point to fit the text within it). The user may not need to prepare or resize tab annotations to fit the expected dimensions for the tab. In such an embodiment, the printing system may use metadata to find tab content and also to define job chapters or sections (which may reset the tabs to position 1). "Metadata" refers to information pertaining to a document that is stored as part of the document file, but does not necessarily appear within the document. Such information may include page count, creation date, an overall number of chapters or sections, etc. Use of metadata that defines tab content without specific layout parameters may enable reprinting on a different tab stock without making any changes to the job.

Tab shape information may be used to facilitate more accurate output from the upstream MakeReady applications. Tab shape information may be used to provide a more accurate preview to users. Tab shape information may allow a user to define and preview background colors and images that will print to the edge of the tab. The upstream MakeReady applications may be used to automate tab formatting, similar to the ways discussed above. Tab shape information may allow the user to take existing tab annotation content (not just metadata) and adjust it (change dimensions and move) when changing tab stocks.

Figure 2:
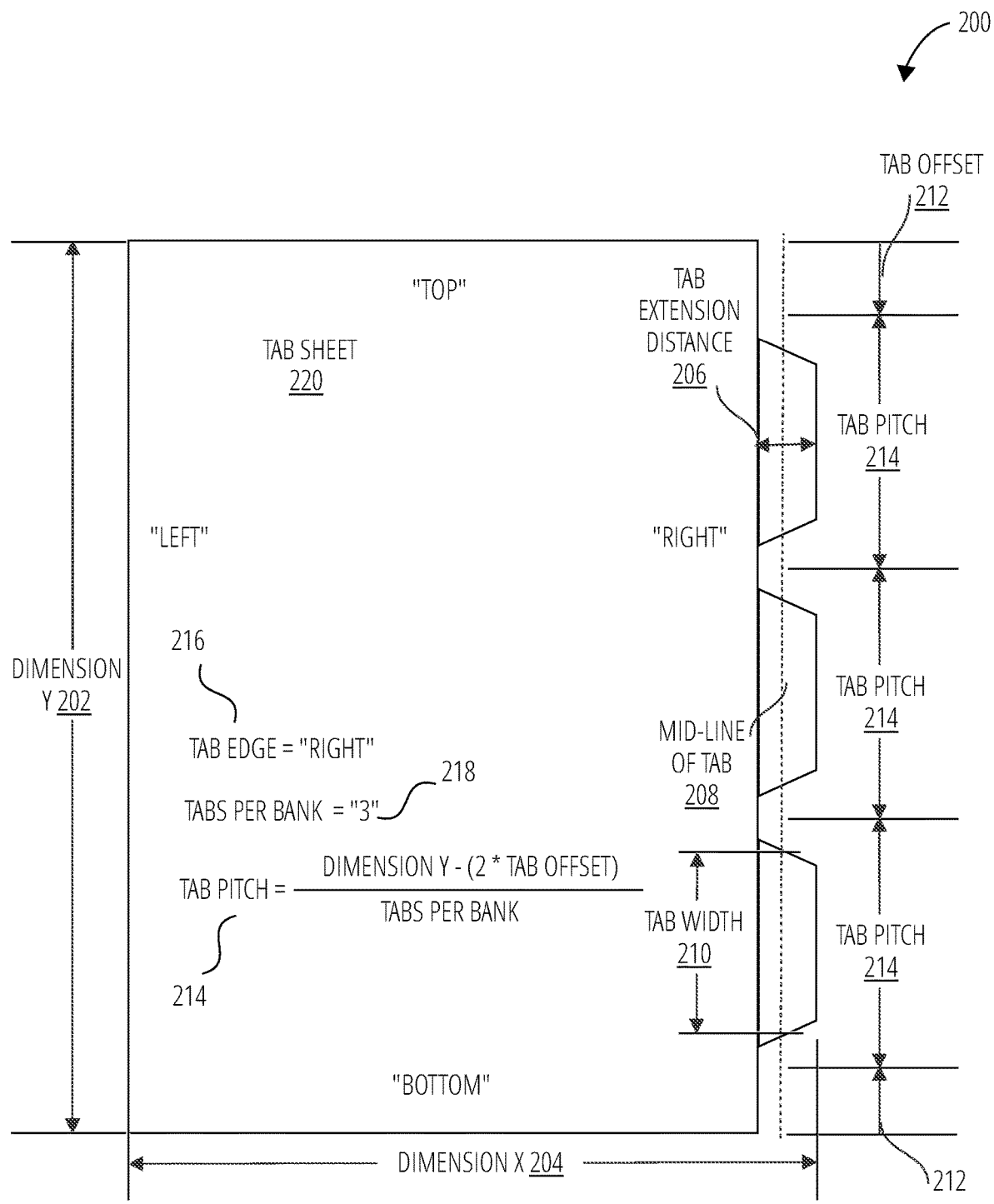
FIG. 2 illustrates a tab bank 200 in accordance with one embodiment.

Referring to FIG. 2, tab shape information associated with a tab bank 200 comprising one or more tab sheet 220 may include a dimension Y 202, a dimension X 204, a tab extension distance 206, a mid-line of tab 208, a tab width 210, a tab offset 212, a tab pitch 214, a tab edge 216, and a number of tabs per bank 218. The dimension Y 202 measures the dimension of the long side of the tab sheet. The dimension X 204 measures the short side of the tab sheet, ending at the outside edge of the tabs. The tab edge 216 captures the edge of the tab sheet where the tabs are located. In this embodiment, tab edge 216="right," as the tabs protrude on the right-hand side. In this embodiment, there are three tab positions in the tab bank, tabs per bank 218="3." Tab extension distance 206 measures how far the tabs protrude from the edge of the tab sheet.

Tab offset 212 is a positive number that measures the distance the tabs are offset from the top and bottom edges of the tab sheet. Tab width 210 measures the width of the tabs along the axis of the tab edge 216. Tab width 210 is measured at the mid-line of tab 208, a calculated line that splits the difference between the tab edge 216 and the dimension X 204 measurement. Put another way, the mid-line of tab 208 falls along a line where half of the tab extension distance 206 is subtracted from the dimension X 204.

In an embodiment, each of the tabs is centered on the tab pitch 214. The tab pitch 214 is not directly measured, but is calculated in Equation 1 as follows:

$$\text{tab pitch} = (\text{dimension } Y - (2*\text{tab offset}))/(\text{tabs per bank}) \quad \text{Equation 1}$$

In an embodiment, the tab shape information may be stored as a vector type or raster type file format, such as a Scalable Vector Graphics (SVG) shape. Using the path function in, for example, an SVG library, lines, curves, and arcs may be created. Complex shapes may be represented by combining multiple straight lines or curved lines. The SVG shape may be used as a clipping path (i.e., a closed vector path or shape, used to cut out an image in image editing software) to remove content outside of the tab. Alternatively, the shape may be rasterized and used as a mask (i.e., a Region of Interest (ROI) mask) to remove content outside of the tab. Masked pixels are excluded from any processing and may be displayed as transparent in a resulting image (i.e., masked raster).

The method and system disclosed herein may capture the tab shape information when a tab bank or tabbed document is scanned.

Referring to FIG. 3, a tabbed document 302 is shown, along with the purged tabs 322 that may be automatically purged before the next print job in an embodiment of sensor-assisted tab printing. The tabbed document 302 may include a front cover 304 and a back cover 320, document content pages 306, and tab stock pages 310 from a tab bank. Tab stock label numbers specify current tab position and number of tab positions 312. Content page label numbers specify PDF pages printed on front and back of sheets 314.

The tabbed document 302 illustration shows how the cover pages, content pages, and tab stock may be interleaved as the document is printed. The drawing illustrates how a tab separates pages that would print on same sheet 308 as needed. For example, without the tab stock, page 18 would appear on the back of page 17. As these two document pages are separated by a tab, however, even pages may print on front after a tab as needed 316. The illustration also shows how cover printing separates pages that would print on same sheet 318.

The tab printing task elements 300 shown involve a job that requires one full and one partial bank of tabs. Once this document is printed, sensor-assisted tab printing allows the printing device to be configured to recognize the three tab stock pages left in the partial, unused tab bank. These tabs may be purged automatically before the next job is started.

Figure 4:
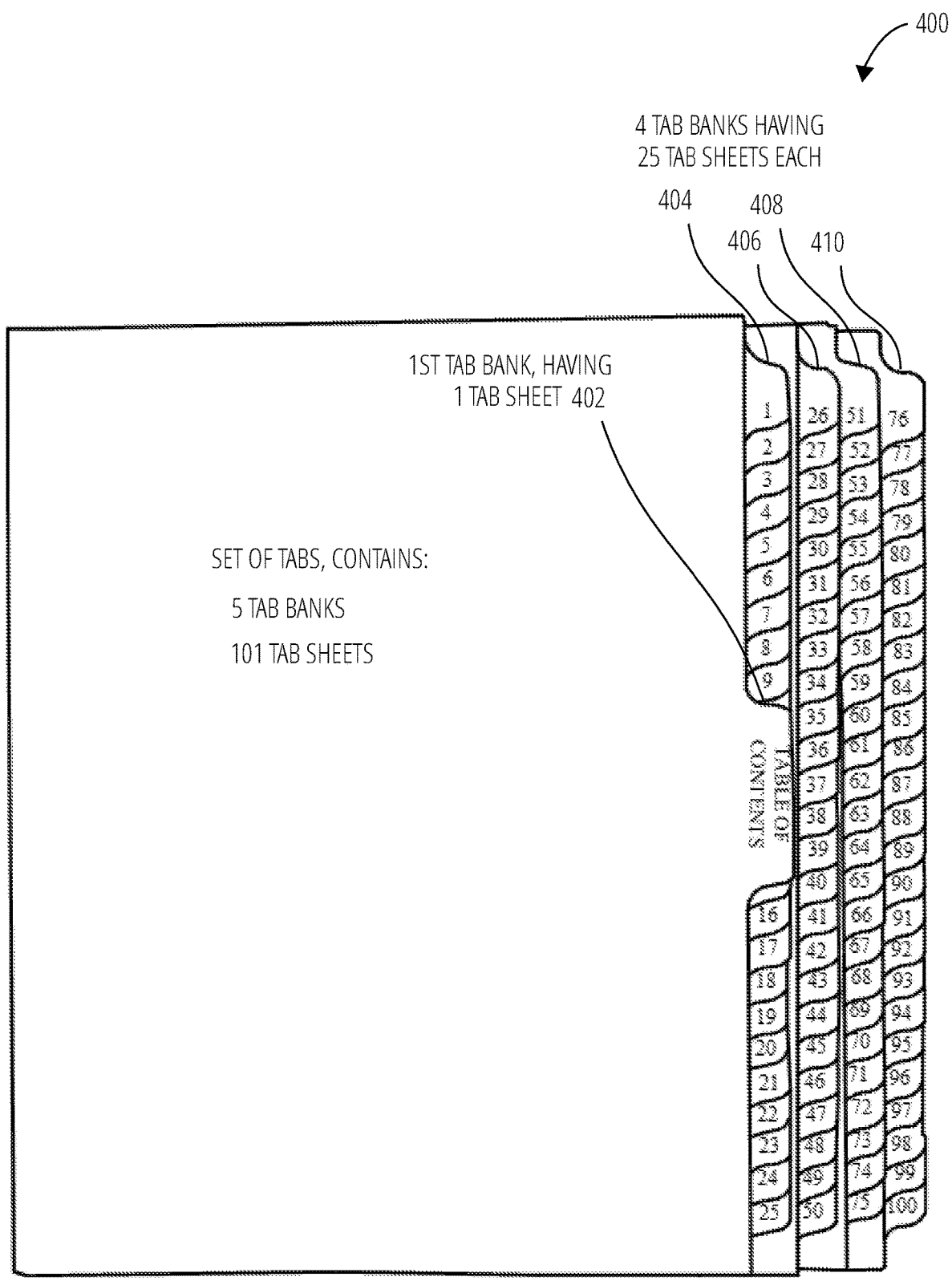
FIG. 4 illustrates a set of tabs 400 in accordance with one embodiment.

FIG. 4 illustrates a set of tabs 400 in accordance with one embodiment. The illustrated set of tabs contains five tab banks. The 1st tab bank, having 1 tab sheet 402, may be a single centered tab, as is typically used in some tab sets to mark, for example, the location of a table of contents. The 2nd tab bank, having 25 tab sheets 404, may be annotated to mark sections 1 through 25. The 3rd tab bank, having 25 tab sheets 406, may be annotated to mark sections 26 through 50. The 4th tab bank, having 25 tab sheets 408, may be annotated to mark sections 51 through 75. The 5th tab bank, having 25 tab sheets 410, may be annotated to mark sections 76 through 100.

This set of tabs 400 may be scanned and analyzed by the system disclosed herein, and the tab shape, dimensions, and location for each tab sheet may be detected and stored, as well as the collation of tab sheets that forms a tab bank, and the various tab banks included in the set of tabs. A holistic representation of the entire set of tabs may be captured and stored. Future print jobs may use all or part of this set of tabs 400, and various aspects of those jobs may be greatly simplified from an operator standpoint by taking advantage of the automation provided by the method and system disclosed herein, based on the holistic tab information previously captured.

In one embodiment, a set of tabs 400 as shown may be purchased with the tab annotations "TABLE OF CONTENTS" and the numbers "1" through "100" pre-printed. A print job that includes a table of contents and up to 100 sections may be printed with such a set of tabs 400 from a file that indicates the start of each section, with no information needed at time of printing other than the selection of this set of tabs from the printer's paper catalog.

Should the document to be printed have only 97 sections, the disclosed system may, at the end of the job, automatically purge the tabs numbered "98," "99," and "100," to a discard tray. In this way, the next copy of the document may be printed with the correct tab sheets automatically in place, with no additional action required by the operator.

Additionally, should a paper jam cause the printer to reset, the tabbed printing system disclosed herein may automatically detect whether or not the next tab available in the tab stock paper feed path is the correct tab, and if it is not, may purge tab sheets to the discard tray until the correct tab is available for inclusion in the printed document.

Figure 5:
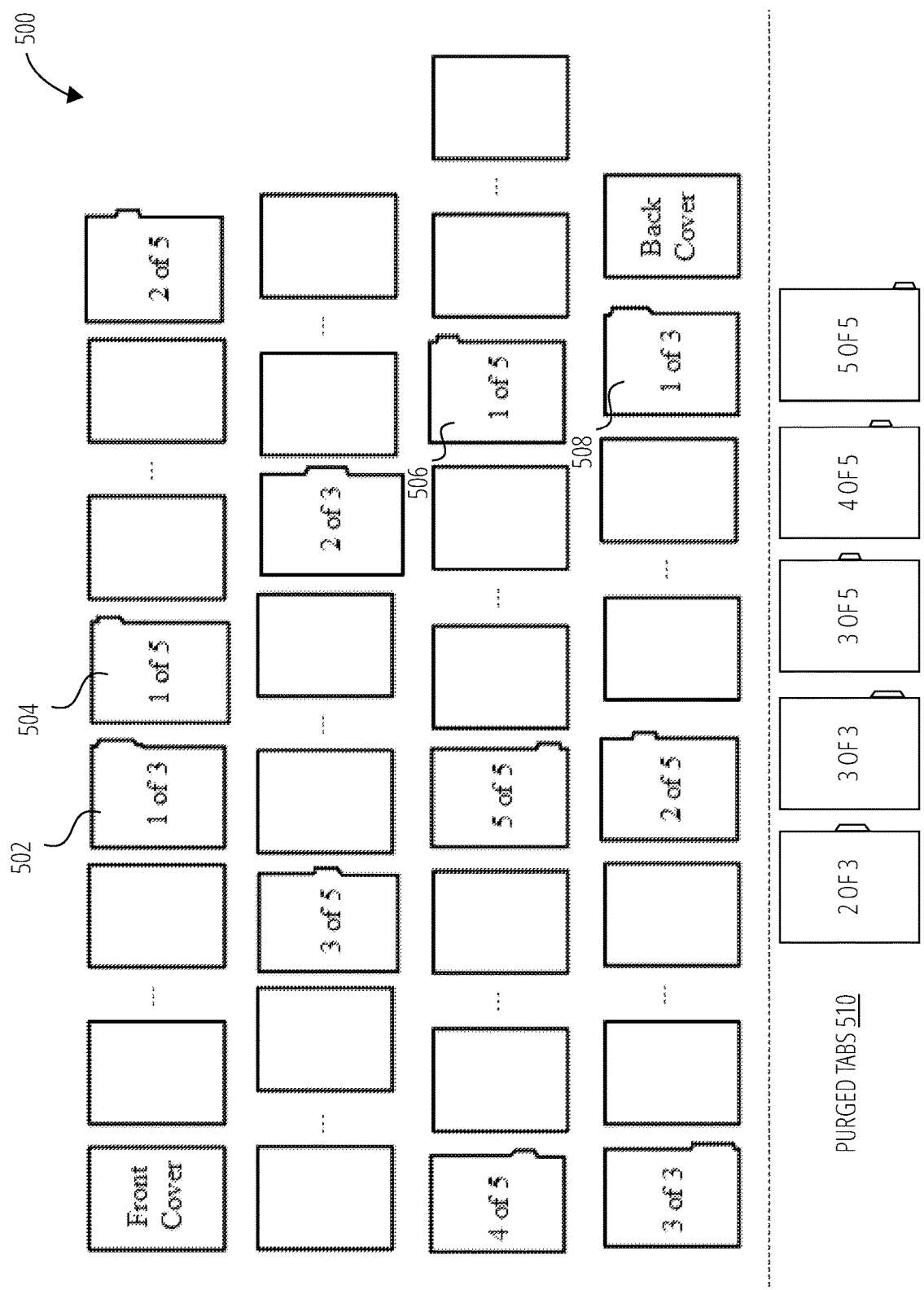
FIG. 5 illustrates a print job with interleaved tab banks 500 in accordance with one embodiment.

FIG. 5 illustrates a print job with interleaved tab banks 500 in accordance with one embodiment. In this example, tab banks of 3 tabs and tab banks of 5 tabs may be scanned and stored in a printer's paper catalog and loaded into trays for printing. The system disclosed herein may be able to automatically select, annotate, and insert into the printed document, the correct tab sheet from the correct paper tray at each tab location defined.

As shown, the print job may include a front cover and some number of pages. At this point, the first of a 3-tab bank may be printed (start of first 3-tab tab bank 502), followed by the first of a 5-tab bank (start of first 5-tab tab bank 504). After the next set of pages, the second of the 5-tab bank may be printed, followed by its subsequent pages, then the third of the 5-tab bank and its subsequent pages.

The second tab sheet of the 3-tab bank is printed at this point, followed by a set of non-tab pages. In some embodiments, the tab set may be configured such that the 5-tab bank would need to be reset, and the disclosed system would do so automatically. In the example shown, however, the next tab sheet needed is the fourth of the 5-tab bank, and the disclosed system would automatically print and include that sheet accordingly.

Printing continues, and the system automatically selects the start of second 5-tab tab bank 506 and the start of second 3-tab tab bank 508 as shown. When the example print job is completed, both trays of tab stock may hold partial tab banks. The disclosed system would detect this based on the information it has stored on both tab stocks. The remaining tab sheets in both tab banks may be purged to a discard tray automatically. These are shown as purged tabs 510. Each action to print or purge a tab sheet may be taken automatically by a system such as that disclosed herein, with no additional manual action needed on the part of the operator.

In an embodiment, the tabs are scanned and checked for positions regarding forward or reverse collation to determine if the print job data and the media are both using the same collation. Forward collation may be represented by 1-n printing whereas reverse printing may be represented by n-1. If there is a mismatch between the job data and the media, the process may perform one of several tasks. First, the process may display an error to the user. Second, the process may purge the sheets in the paper path and then reverse the order of the print job so that it prints in the same order as the tabs (e.g., if the job was printing 1-n but the tabs were reversed, then the system would purge the sheet and change the print order to match the media).

FIG. 6 illustrates tab annotation adjustments 600 in accordance with one embodiment. If a print job using a conventional tab printing system is designed for a particular tab stock, there is little flexibility to print on other tab stocks should that stock not be available. The layout of the print job may need to be adjusted manually before the job is sent to the printer.

Because the disclosed system and method collect and store a holistic and exact representation of a tab stock to be used, these adjustments to the layout of tab annotations may be performed more efficiently and on the fly. For example, a print job may be laid out with the expectation of using a 5-tab tab stock (602). At printing, however, 5-tab stock may not be available. Alternately, available 5-tab stock may be more costly than is feasible, or the job may have originally held a number of sections that used two full banks of 5-tab stock, but after revision, may only use part of one bank, resulting in the potential to purge and waste unused tabs.

Because of this, at the time of printing, 3-tab stock may be more readily available, affordable, or desirable for other reasons. The system disclosed herein may be aware that 3-tab stock has been loaded, and because the location and dimensions of the tabs are known, the system may automatically detect a tab annotation and relocate it to the correct print location. In this way, a job laid out for 5-tab stock may be automatically and cleanly printed on 3-tab stock (604).

Detecting and storing a holistic representation of the entire tab set for a print job may allow for additional performance and efficiency improvements. Using conventional printing technology, should an error occur or a packet of tab stock be collated incorrectly, such errors may go undetected until the job is complete, leaving a number of the resulting tabs blank because the printer deposited ink where a tab was expected, but was not actually in place. This ink would be instead deposited on the inside of the printing apparatus. However, with a stored representation of the entire tab set, the printing system disclosed herein may be able to detect when a tab sheet fed to the printer does not have a tab in the expected location. At this point, the printer may pause printing and purge the tab stock to a discard tray until a tab sheet is found having the tab in the correct location.

In other embodiments, additional applications for this ability may be leveraged. A tabbed document designed to print using a specific set of tabs collated with the first tab at the top and the last tab at the bottom may be easily set to print automatically on tab stock collated with the first tab at the bottom. Because the paper catalog contains a holistic set of data on the tab stock loaded in the tray, the printer may reconfigure the print job on the fly to print text annotated for tab printing in the correct location based on the scanned and stored data, rather than in strict conformance with the print layout.

Figure 7:
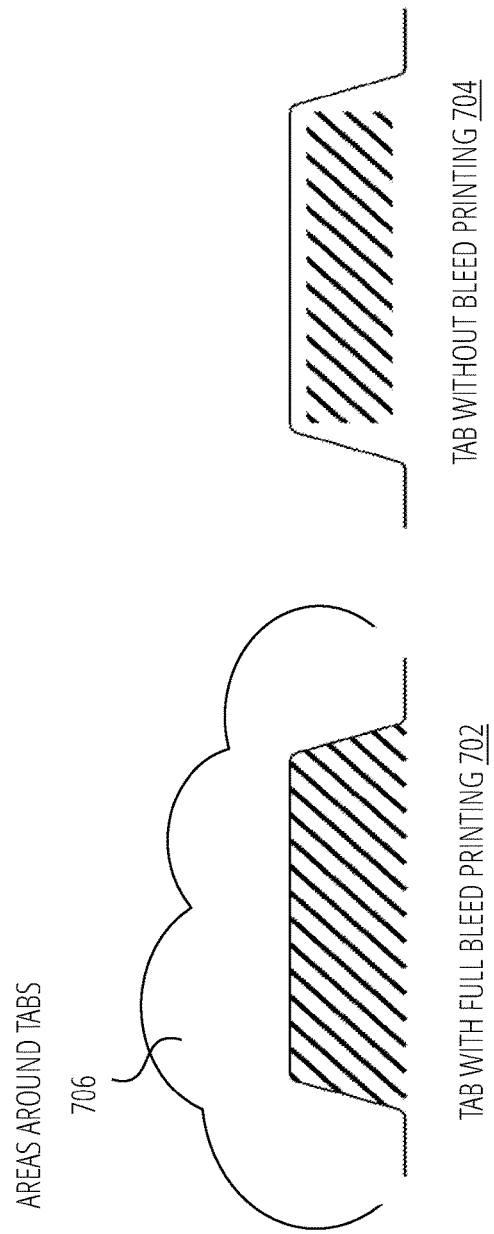
FIG. 7 illustrates full bleed and no bleed tabs 700 in accordance with one embodiment.

Referring to FIG. 7, full bleed and no bleed tabs 700 provides an illustration of a tab with full bleed printing 702 and a tab without bleed printing 704. In conventional tab printing tasks, print files may be designed to constrain tab background and text elements within a rectangle that will fit either a specific tab bank or may be to some extent universal, fitting most or all tab banks. These constraints are needed to prevent ink from being deposited within the printing mechanism, instead of on the tab stock. Deposited ink residue buildup may prevent the printing mechanism from functioning as needed.

With the sensor-assisted tab printing method and system disclosed herein, tab shape information from the scanned tab bank may permit tabs to be printed with full bleed printing, without requiring post-print die cutting. Tab shape information may be used to both automatically format tab background and text content such that it fits on the expected tab stock, and to mask the area around the physical tab, such that no ink is deposited outside of the tab boundaries. This is similar to masking that may be performed when printing on paper with drilled holes, to prevent ink from being deposited in the hole area instead of the page area.

Figure 8:
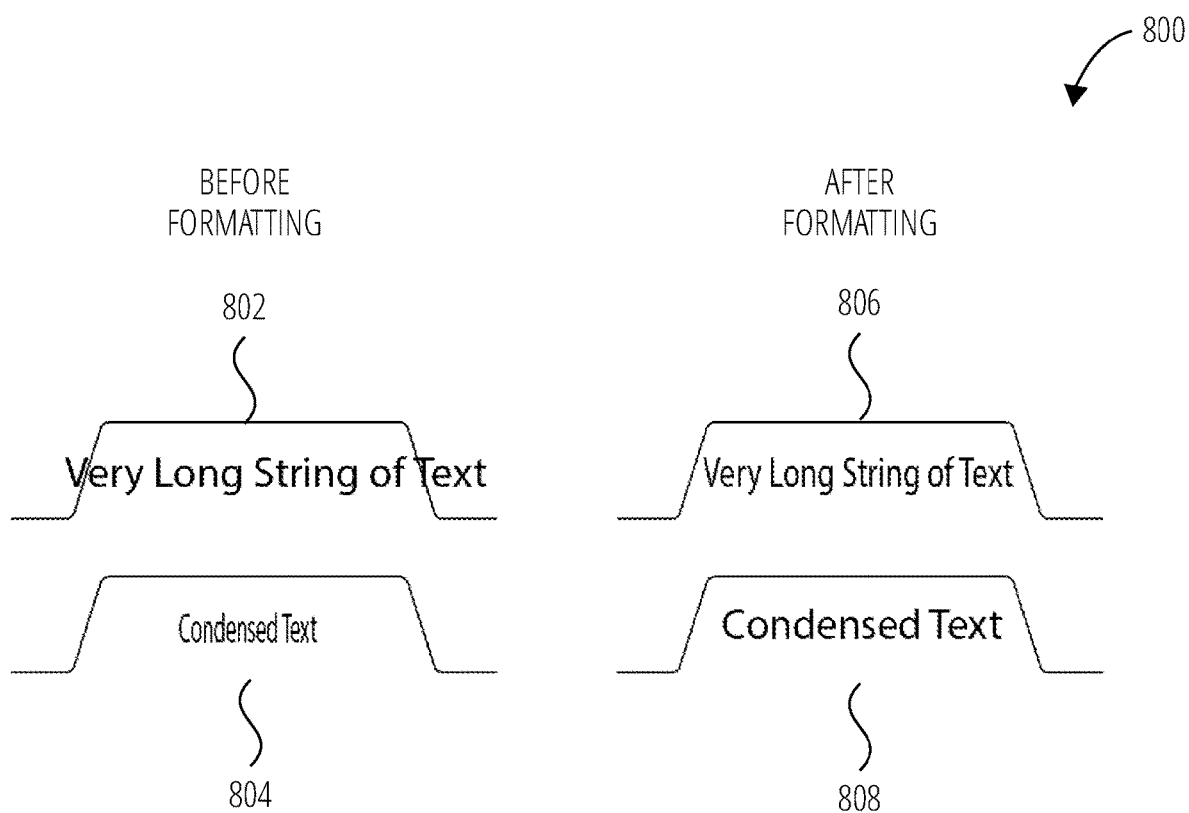
FIG. 8 illustrates tab annotation formatting 800 in accordance with one embodiment.

FIG. 8 illustrates tab annotation formatting 800 in accordance with one embodiment. A print job may be defined with tab annotations that do not fit ideally into the tab stock that will be used to print the job. For example, a string of text may be defined that is too long to fit on the tab to be used (802). The print job may not specify the appropriate way to print this, or the document may have been designed with a wider tab in mind. If this error is not caught, a conventional printer may simply print the text as specified, leaving an incomplete string on the tab itself, and depositing ink on the inside of the printer.

Because the disclosed system has captured the dimensions and tab locations of the tab stock to be used, a problem like this may be corrected automatically, on the fly, by adjusting the long text string such that it will fit on the tab (806). Some embodiments may also detect text that has been condensed to fit on a smaller expected tab size (804). In such a case, the system may be configured to optimize text size for the actual tab stock in use, and the condensed text may be expanded to fit the tab width and improve readability (808).

FIG. 9 illustrates several components of an exemplary sensor-assisted tab printing system 900 in accordance with one embodiment. In various embodiments, sensor-assisted tab printing system 900 may include a desktop PC, server, workstation, mobile phone, laptop, tablet, set-top box, appliance, or other computing device that is capable of performing operations such as those described herein. In some embodiments, the computing logic performing these operations may be integrated into a multifunctional peripheral. In some embodiments, sensor-assisted tab printing system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, sensor-assisted tab printing system 900 may comprise one or more physical and/or logical devices that collectively provide the functionalities described herein. In some embodiments, sensor-assisted tab printing system 900 may comprise one or more replicated and/or distributed physical or logical devices.

In some embodiments, sensor-assisted tab printing system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

The sensor-assisted tab printing system 900 may include a display 902, a scanning device 904 with a contact image sensor 906, a printing device 908, a central processing unit 910, a memory 912 containing an operating system 918 and a paper catalog 920, a non-transitory computer-readable medium 924, a network interface 926, and a bus 922 connecting the various elements.

Memory 912 generally comprises a random access memory ("RAM") and permanent non-transitory mass storage device, such as a hard disk drive or solid-state drive. Memory 912 stores an operating system 918 and other logic to perform the techniques disclosed herein, such as a printing application 916 and upstream MakeReady applications 914. In some embodiments the printing application 916 and/or upstream MakeReady applications 914 may be stored in different devices.

These and other software components may be loaded into memory 912 of sensor-assisted tab printing system 900 using a drive mechanism (not shown) associated with a non-transitory computer-readable medium 924, such as a DVD/CD-ROM drive, memory card, network download, or the like.

Memory 912 also includes paper catalog 920 containing tab shape information for various tab stocks. In some embodiments, sensor-assisted tab printing system 900 may communicate with the paper catalog 920 via network interface 926, a storage area network ("SAN"), a high-speed serial bus, and/or via the other suitable communication technology.

In some embodiments, the paper catalog 920 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

The methods and system in this disclosure are described in the preceding on the basis of several preferred embodiments. Different aspects of different variants are considered to be described in combination with each other such that all combinations, upon reading by a skilled person in the field on the basis of this document, may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A method for sensor-assisted tab printing comprising:
   scanning a set of tabs, wherein the set of tabs includes at least one tab sheet that is a sheet of material appropriate for printing on which part of a side extends out from the side as a tab;
   sensing tab shape information for tab positions in the set of tabs;
   storing sensed tab shape information; and
   applying the sensed tab shape information to printing applications, before printing on the set of tabs or inserting the set of tabs into a document, to perform at least one of (a) masking areas around tabs during tab printing tasks, wherein masking the areas around tabs allows full bleed printing at each of the tab positions, (b) detecting and purging unused tabs between the tab printing tasks, and (c) automatically formatting tab printing annotations.

2. The method of claim 1, wherein the sensing includes:
   storing the tab shape information in a vector type or raster type file format;
   creating a tab shape mask from the vector type or raster type file format; and
   removing content outside of the tab shape mask.

3. The method of claim 1, wherein the set of tabs comprises at least one complete tab bank, wherein the tab bank includes one sheet for each of the tab positions in the tab bank.

4. The method of claim 1, further comprising:
   on condition that a paper jam leaves a partial tab bank unused, applying the sensed tab shape information to purge unused tabs and reset to a next tab position.

5. The method of claim 1, wherein the set of tabs is scanned through a multifunctional peripheral's scanning device and the printing applications comprise one or more of:
   digital front end applications; and
   upstream MakeReady applications.

6. The method of claim 1, further comprising using the sensed tab shape information to detect and purge unused tabs during the tab printing tasks in response to the tab position being reset between sections.

7. The method of claim 1, further comprising:
   analyzing print job data and the sensed tab shape information, wherein the print job data includes information related to tab positions in a print job sent to the printing applications; and
   on condition a next tab position in the sensed tab shape information does not match the tab position in the print job data, purging unused tabs.

8. The method of claim 1, further comprising:
   analyzing content intended for printing;
   detecting a portion of the content intended for printing that includes the tab printing annotations; and
   automatically formatting the tab printing annotations to fit the set of tabs based on the sensed tab shape information.

9. The method of claim 1, further comprising:
   reading content intended for printing; and
   determining if a tab is needed, wherein
      on condition a tab is needed:
         using the sensed tab shape information to determine a type of tab stock needed to print the content intended for printing; and
         automatically feeding the type of tab stock needed to a printing device based on the sensed tab shape information, wherein the printing device includes a plurality of paper feed elements; and on condition a tab is not needed:
  printing content without the tab.

10. The method of claim 1, wherein the set of tabs comprises the tab sheet or the tab sheets interleaved with a plurality of printed sheets to form a tabbed document.

11. The method of claim 1, wherein the set of tabs comprises a partial tab bank and wherein the method further comprises calculating approximate tab shape information for the tab sheet or the tab sheets that are missing.

12. The method of claim 1, further comprising:
  analyzing print job data and the sensed tab shape information, wherein the print job data includes information related to tab bank collations in a print job sent to the printing applications; and
  on condition a next tab position in the sensed tab shape information does not match the tab bank collations in the print job data, performing at least one of:
    displaying an error to the user; and
    purging media in a paper path and reversing the order of the print job to print the media and the tabs in the print job in a same order as the tabs in the sensed tab shape information.

13. A sensor-assisted tab printing system, the sensor-assisted tab printing system comprising:
  a scanning device;
  a sensor capable of sensing tab shape information;
  a printing device; and
  a computing apparatus comprising:
    a processor; and
    a memory storing instructions that, when executed by the processor, configure the system to:
      scan a set of tabs;
      sense the tab shape information for tab positions in the set of tabs;
      store sensed tab shape information;
      apply the sensed tab shape information to printing applications, before printing on the set of tabs or inserting the set of tabs into a document, to perform at least one of (a) masking areas around tabs during tab printing tasks wherein masking the areas around tabs allows full bleed printing at each of the tab positions, (b) detecting and purging unused tabs between the tab printing tasks, and (c) automatically formatting tab printing annotations, and
      print the set of tabs and insert the set of tabs, using the printing device and the applied sensed tab shape information, into the document.

14. The sensor-assisted tab printing system of claim 13, wherein the system is a multifunctional peripheral and the sensor is a contact image sensor.

15. The sensor-assisted tab printing system of claim 13, the memory further instructing the system, on condition that a paper jam leaves a partial tab bank unused, to apply the sensed tab shape information to purge unused tabs and reset to a next tab position.

16. The sensor-assisted tab printing system of claim 13, the memory further instructing the system to:
  analyze content intended for printing;
  detect a portion of the content intended for printing that includes the tab printing annotations; and
  automatically format the tab printing annotations to fit the set of tabs based on the sensed tab shape information.

17. The sensor-assisted tab printing system of claim 13, wherein the printing applications comprise one or more of digital front end applications and upstream MakeReady applications stored in the memory.

18. The sensor-assisted tab printing system of claim 13, wherein the memory instructs the system to use the sensed tab shape information to detect and purge unused tabs during the tab printing tasks in response to the tab positions being reset between sections.

19. The sensor-assisted tab printing system of claim 13, wherein the printing device includes a plurality of paper feed elements that are automatically selected to feed the set of tabs to the printing device based on the sensed tab shape information.

20. The sensor-assisted tab printing system of claim 13, wherein the set of tabs comprises a partial tab bank and wherein the memory further instructs the system to calculate approximate tab shape information for one or more tab sheets that are missing.

* * * * *